United States Patent [19]

Ratcliffe et al.

[11] Patent Number: 5,299,107
[45] Date of Patent: Mar. 29, 1994

[54] ILLUMINATED FISH LURING MEANS

[75] Inventors: Michael P. Ratcliffe, Mississauga; Ralph D. Ratcliffe, Oakville; Timothy R. Ratcliffe; Wayne A. Ratcliffe, both of Mississauga, all of Canada

[73] Assignee: Lure Lite Incorporated, Oakville, Canada

[21] Appl. No.: 987,693

[22] Filed: Dec. 9, 1992

[51] Int. Cl.$^5$ .................................................. F21V 31/00
[52] U.S. Cl. .................................. 362/158; 43/17.6; 200/220
[58] Field of Search ............... 362/158, 124, 109; 43/17.6, 17.5; 200/220, 235, 236

[56] References Cited

U.S. PATENT DOCUMENTS

| 2,598,471 | 5/1952 | Waite | 43/17.6 |
|---|---|---|---|
| 3,001,315 | 9/1961 | Zimmermann | 43/17.6 |
| 3,040,462 | 6/1962 | Guida | 43/17.6 |
| 3,535,812 | 10/1970 | Crecelius | 43/17.6 |
| 3,828,177 | 8/1974 | Day | 43/17.6 |
| 3,940,868 | 3/1976 | Northcutt | 43/17.6 |
| 4,250,650 | 2/1981 | Fima | 43/17.6 |
| 4,250,651 | 2/1981 | Ramme | 43/17.6 |
| 4,426,803 | 1/1984 | Helling | 43/17.6 |
| 4,727,674 | 3/1988 | Garr | 43/17.6 |
| 4,757,632 | 7/1988 | Grobl | 43/17.6 |
| 4,763,433 | 8/1988 | Kulak | 43/17.6 |
| 4,799,327 | 1/1989 | Treon | 43/17.6 |
| 4,885,864 | 12/1989 | Carner | 43/17.6 |
| 5,076,003 | 12/1991 | Chen | 43/17.5 |

FOREIGN PATENT DOCUMENTS 0640967  6/1962  Italy .................................... 43/17.6

Primary Examiner—Richard R. Cole
Assistant Examiner—Alan B. Cariaso
Attorney, Agent, or Firm—Donald E. Hewson

[57] ABSTRACT

An electrically powered illuminating fish luring means for use in conjunction with a fishing line, is disclosed. The fish luring means comprises a water resistant protective housing having a generally hollow interior. There is a battery or batteries, a light emitting diode, and a movement actuated switch means in the form of a mercury switch, preferably a mercury tilt switch, securely retained within the protective housing. The mercury tilt switch is electrically connected in series with the batteries and the light emitting diode, for turning on and off the light emitting diode. The mercury tilt switch has a first terminal, a second terminal, and a mercury bead adapted to contact the first and second terminals so as to thereby connect the first and second terminals in electrically conductive relation with each other. As the fish luring means moves through the water, the mercury tilt switch is correspondingly moved so as to alternatingly connect the first and second terminals in electrically conductive relation with each other, and break the connection such that the movement actuated switch means becomes correspondingly open and closed intermittently, thus turning on and off the light emitting diode.

14 Claims, 2 Drawing Sheets

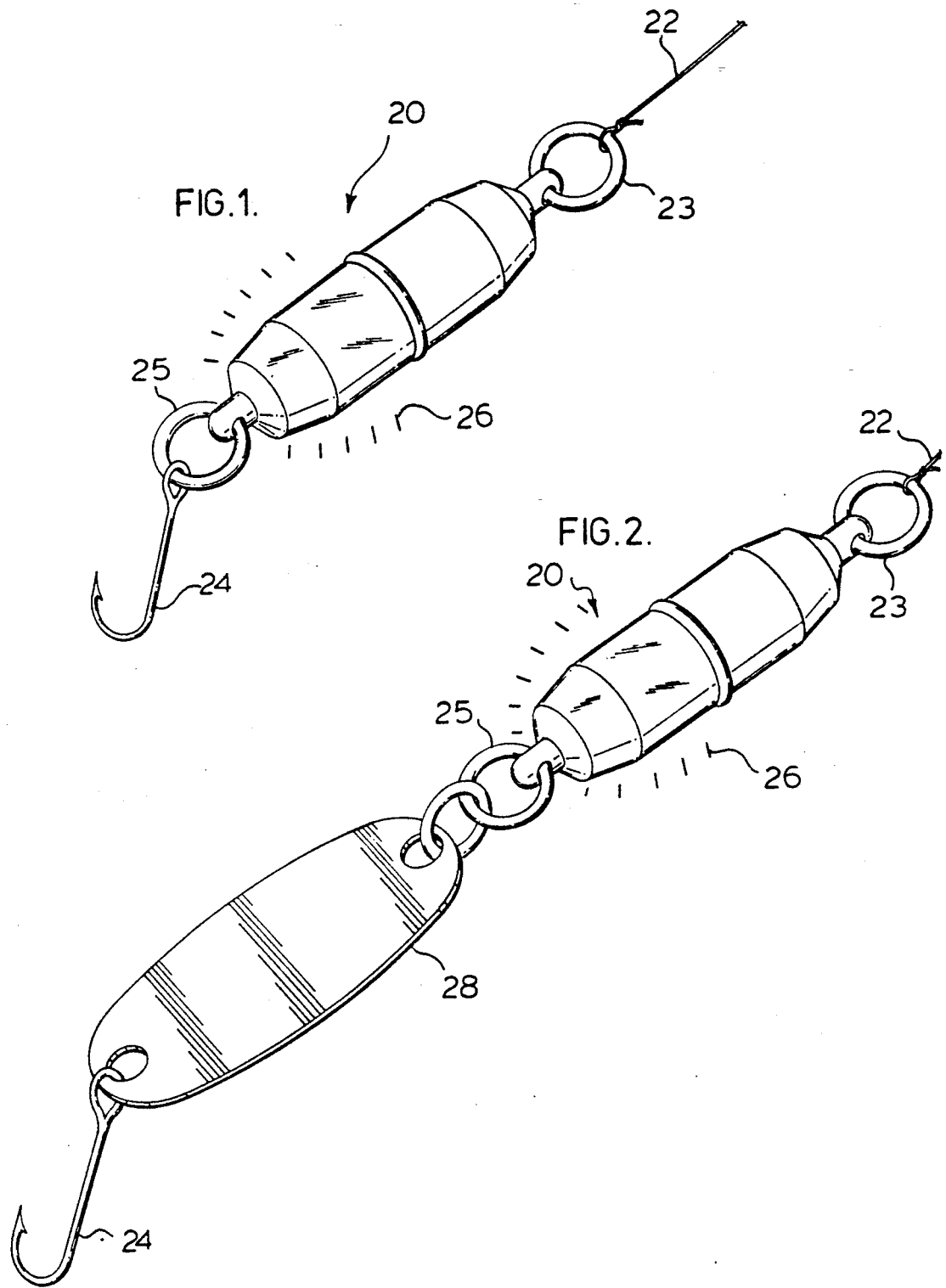

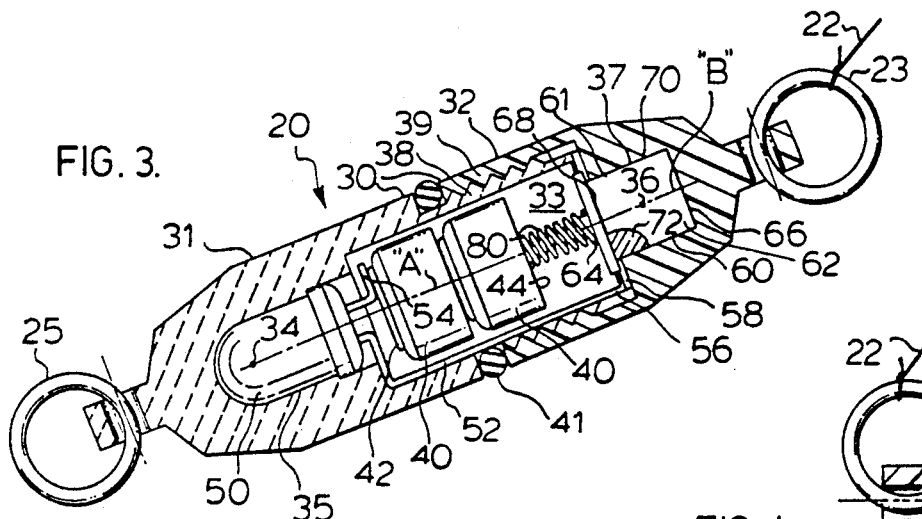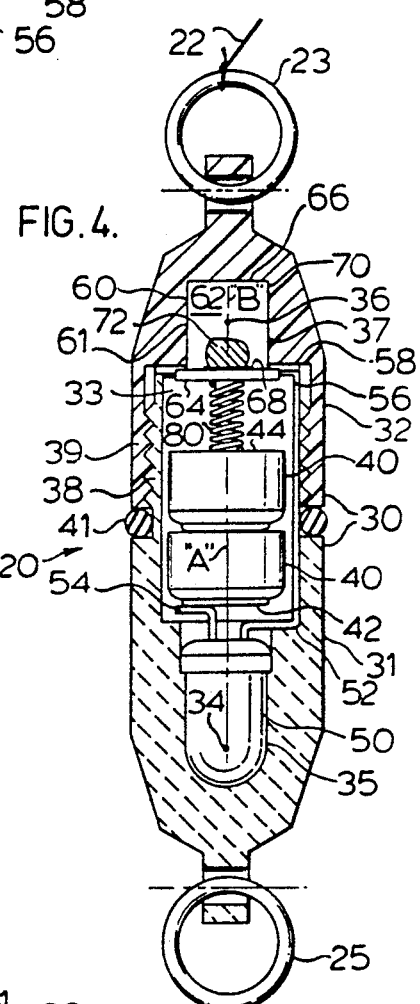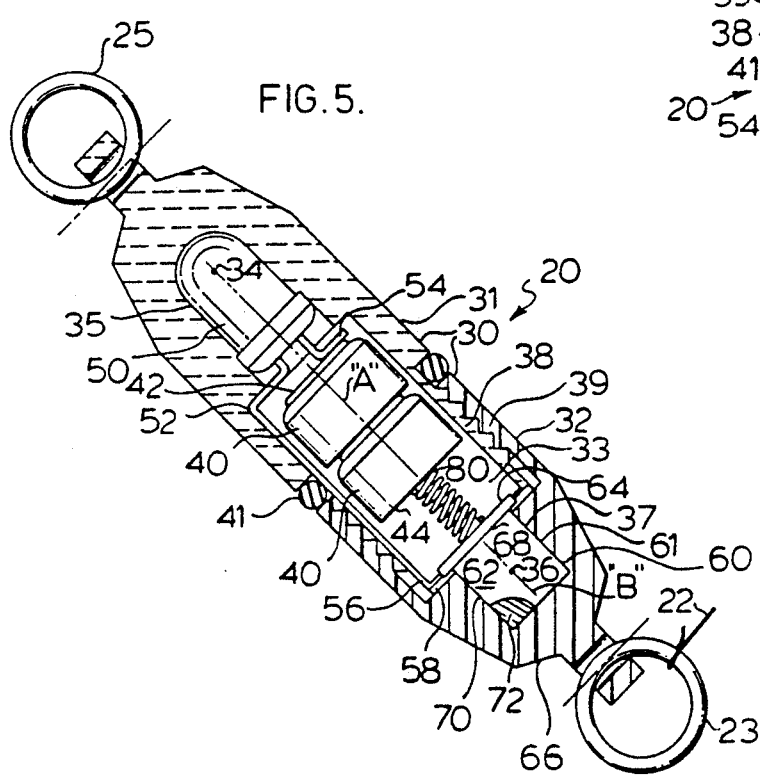

ILLUMINATED FISH LURING MEANS

FIELD OF THE INVENTION

This invention relates to fishing lures and more particularly to illuminated fishing lures. Specifically, an electrically powered fishing luring means that turns on and off as it moves through the water is disclosed.

BACKGROUND OF THE INVENTION

One of the aims of a person who is sport fishing is to maximize the number of fish caught in a given length of time, or at least to enhance the likelihood of catching fish, up to the maximum number of fish allowed per day as per local regulations. In order to enhance the likelihood of catching a fish, and thereby maximizing the number of fish caught per day, it is known to use a lure or lures in conjunction with a hook or hooks, in order to attract a fish to the hook. Many different kinds and types of lures are readily available. The basic premise behind a lure is that it is readily visible to a fish and the fish is attracted to the lure. In order to make the lure visible and attractive to the fish, a lure is typically shiny and brightly coloured in order to reflect light. Further, lures are typically designed to experience a high degree of movement as they are pulled through water, to some degree emulating the action of a smaller fish as it moves through water. By this movement, the pattern of light reflecting off a lure will change, thus providing further attractiveness to a fish.

One problem with this type of lure is that light, typically sunlight, must first reach the lure in order to reflect off the lure. Thus, the deeper a lure is located in water, the less effective it becomes. Further, muddy water, or the like, obscures the passage of light through the water, thus making lures much less effective.

Another consideration is that lures cannot be effectively used at night, since there is relatively little light from the moon or stars, at least compared to the amount of light received from the sun.

It can therefore be seen that what is needed is a self-illuminating fish luring means that does not depend on light from an exterior source such as the sun, and further varies the light transmitted therefrom so as to more readily attract fish as compared to a constant level source of light.

PRIOR ART

Several forms of illuminated lures, or lure means meant to be used in conjunction with lures, are known in the prior art, and include the following devices.

U.S. Pat. No. 3,001,315 to ZIMMERMAN, discloses an illuminating fishing lure comprising a lamp and an electric circuit for energizing the lamp. The lamp is mounted in a translucent portion of the body so as to be readily visible. There is a contact in the electric circuit that is movable between an open position and a closed position, with a control member rigidly connected to the contact. A pivotally mounted deflector means moves so as to engage the control member, and thereby alternatingly close and open the electric circuit. The deflector means is itself moved by the passage of the lure through water.

U.S. Pat. No. 3,040,462 to GUIDA discloses a luminescent fish lure having a light bulb and a battery in a rear chamber portion. The light bulb extends into a bore in a partition that divides the rear chamber portion from a front chamber portion. The front chamber portion has a bore that allows it to be in communication with the ambient surroundings. The light bulb fits tightly into the bore so as to form a water resistant interface.

U.S. Pat. No. 3,828,177 to DAY, discloses an illuminated fishing lure having a battery and a light bulb therein with the light bulb shining into the ends of a fibre optic bundle. The fibre optic strands in the fibre optic bundle extend through a hole in the front of the lure and thereby provide a plurality of light points for attracting a fish.

U.S. Pat. No. 4,250,650 to FIMA discloses an intermittently illuminated fishing lure having a light source, a plurality of stationary electrical contacts disposed along a guide way within the lure, and a battery freely movable within the guide way. As the battery moves along the guide way, it intermittently contacts the stationary electrical contacts and correspondingly intermittently energizes the light source.

U.S. Pat. No. 4,250,651 to RAMME discloses a lighted fish lure having a battery chamber with batteries therein and a light bulb adapted to illuminate the front end of the lure. An electrically conductive spring member contacts one end of the battery and contacts a conductive member that is in electrical contact with the light bulb so as to complete an electrical circuit. The spring member contacts the battery when the rear cap of the lure is in place.

U.S. Pat. No. 4,426,803 HELLING discloses an illuminated fishing lure having batteries and an LED connected in electrical relation in a circuit. There are first and second sections that are slidably movable with respect to each other. A switch means is opened and closed intermittently as the two sections move with respect to one another, as the fishing line pulls one of the sections.

U.S. Pat. No. 4,727,674 to GARR discloses an electronically lighted fish lure having a battery and a light emitting diode forming an electrical circuit. A fibre optic bundle transmits light from the LED to the exterior of the lure at a plurality of locations.

U.S. Pat. No. 4,757,632 to GROBL, discloses a light emitting fishing lure containing a battery and a pair of light emitting diodes therein. The light emitting diodes become energized when the head portion is rotated to an on position.

U.S. Pat. No. 4,763,433 to KULAK discloses a metal lighted lure including a pair of batteries and a light emitting diode therein, and having a channel therein that allows water to enter the lure, with the water completing an electrical circuit between the batteries and the light emitting diode, thus causing the light emitting diode to be illuminated.

SUMMARY OF THE INVENTION

The present invention discloses an electrically powered illuminating fish luring means for use in conjunction with a fishing line. The fish luring means comprises a water resistant protective housing having a generally hollow interior, a first datum point, a second datum point, and a first longitudinal axis passing through the first and second datum points. There is an electrical power source having a first terminal and a second terminal, with the electrical power source being securely retained within the interior of the protective housing, and an electrically powered illuminating means having a first lead and a second lead securely retained with the protective housing. A movement actuated switch means is provided and is electrically connected in series with the electrical power source and the electrically powered illuminating means for turning on and off the electrically powered illuminating means. The electrical power source, the electrically powered illuminating means, and the switch means are in a complete electrical circuit, and the electrically powered illuminating means is energized by the electrical power source when the switch means is closed.

The movement actuated switch means has a generally hollow interior having a first end, a second end, and a second longitudinal axis generally centrally aligned within the hollow interior; a first terminal and a second terminal, with at least the first terminal disposed near the first end of the generally hollow interior; and a terminal bridge member adapted to contact the first and second terminals so as to thereby connect the first and second terminals in electrically conductive relation with each other. The terminal bridge member can move within the hollow interior of the movement actuated switch means in a direction that is, at least in part, perpendicular to the second longitudinal axis so as to alternatingly connect the first and second terminals in electrically conductive relation with each other, and break the connection upon angular and translational movement of the movement actuated switch means such that the movement actuated switch means becomes correspondingly opened and closed intermittently.

BRIEF DESCRIPTION OF THE DRAWINGS

Embodiments of the present invention will now be described by way of the accompanying drawings, in which:

FIG. 1 is a pictorial representation of the luring means of the present invention attached to the end of a fishing line and having a hook attached at the other end thereof, with the luring means in an illuminated state;

FIG. 2 is a pictorial representation of the luring means of the present invention shown in FIG. 1, on the end of a fishing line but with a fishing lure attached to the other end thereof;

FIG. 3 is a sectional view of the luring means of FIG. 1, with the luring means oriented at a downwardly directed angle from the fishing line;

FIG. 4 is a sectional view of the luring means of FIG. 1, with the luring means oriented vertically downwardly from the fishing line; and FIG. 5 is a sectional view of the luring means of FIG. 1, with the luring means oriented at any upwardly directed angle from the fishing line.

DETAILED DESCRIPTION OF THE PREFERRED EMBODIMENTS

Reference will now be made to FIG. 1, which shows an electrically powered illuminating fish luring means 20 of the present invention tied to a fishing line 22 at one end thereof, by way of ring 23, and being pulled through the water by the fishing line 22. At the other end of the luring means 20 is a hook 24, for catching fish thereon, which is attached to the luring means 20 by way of ring 25. The luring means 20 emits rays of light 26 so as to entice a fish to try and eat it, and thus becoming caught on the hook 24.

FIG. 2 shows a similar arrangement to that shown in FIG. 1 with the luring means 20 tied to a fishing line 22 at one end thereof and being pulled through the water by the fishing line 22. A lure 28 is attached to the other end of the luring means 20 and a hook 24 is attached at the far end of the lure 28. Again, the luring means 20 is illuminated and is emitting rays of light 26.

In use, the luring means 20 alternatingly turns on and off so as to intermittently emit light therefrom, so as to provide a source of light to attract a fish and also to provide a source of light that is more attractive to a fish that is a constant source of light. The mechanism by which the luring means 20 is alternatingly turned on and off will be described subsequently.

Reference will now be made to FIGS. 3 through 5, which show the luring means 20 of the present invention in various orientations. In FIG. 3, the luring means 20 is oriented at a downwardly directed angle from the fishing line 22. In FIG. 4, the luring means 20 is oriented vertically downwardly from the fishing line 22. In FIG. 5, the luring means 20 is oriented at an upwardly directed angle from the fishing line.

The luring means 20 comprises a water resistant protective housing 30, including a first half 31 and a second half 32. The protective housing 30 is preferably made from plastic material, with the first half 31 being made of light transmitting material, preferably a clear plastic. The protective housing 30 has a generally hollow interior 32, a first datum point 34, a second datum point 36, and a first longitudinal axis "A" passing through the first and second datum points 34, 36. The purpose of the first and second datum points 34, 36 is to provide a reference orientation for the luring means 20, and are strictly for illustrative purposes.

The first half 31 and the second half 32 of the protective housing 30 having co-operating threaded portions 38 and 39 respectively, and O-ring 41 is located between facing portions of the first half 31 and the second half 32 to ensure that a tight water resistant seal is made therebetween.

An electrical power source in the form of batteries 40, which are preferably button-type batteries, is securely retained within the hollow interior 32 of the protective housing 30. For the sake of discussion, the batteries 40 will subsequently be referred to as battery 40 since one or more suitable size batteries could be used, and will be considered to have a first terminal 42 and a second terminal 44.

Also securely retained within the protective housing 30 is an electrically powered illuminating means in the form of a light emitting diode 50. The light emitting diode 50 is preferably retained within the first half 31 of the protective housing 30 so as to illuminate the entire first half 31, thus providing a very wide angle of illumination for the illuminating fish luring means 20 of the present invention. The light emitting diode 50 has a first lead 52 and a second lead 54, with the second lead 54 in electrically conductive relation with the first terminal 42 of the battery 40. The first lead 52 extends past the battery 40, and will be discussed in greater detail subsequently.

Also situated within the hollow interior 32 of the protective housing 30, entirely within the second half 32 thereof, is a movement actuated switch means 60 in the form of a mercury tilt switch 60.

The mercury tilt switch 60 is a non-positive contact switch means in that the electrical connection between the first terminal 68 and the second terminal 70 may be alternatingly made and broken by way of appropriate movement of the mercury tilt switch 60. Other forms of non-positive contact switch means may be used in place of the mercury tilt switch 60, however, the mercury tilt switch 60 is the most readily available form. It is also contemplated that a regular mercury switch having both terminals at one end thereof may be used in place of the mercury tilt switch so as to provide a slightly different on and off action for the light emitting diode 50, without departing from the spirit and scope of the invention.

The mercury tilt switch 60 has a main body portion 61, a generally hollow interior 62, a first end 64 and a second end 66. There is a second longitudinal axis "B" generally centrally aligned within the hollow interior 62. There is a first terminal 68 centrally disposed at the first end 64 thereof and a second terminal 70 disposed generally around the periphery of the generally hollow interior 62 so as to generally form the main body portion 61. A mercury bead 72 is retained within the generally hollow interior 62 of the main body portion of the mercury tilt switch 60 and is free to move around therein, under the influence of gravity, as the mercury tilt switch 60 experiences angular and translational movement. The mercury bead 72 is a terminal bridge member that is adapted to contact the first and second terminals 68, 70 to thereby connect the first and second terminals 68, 70 in electrically conductive relation with one another. The distance between the first terminal 68 and the second terminal 70 is considerably less than the size of the mercury bead 72. In the preferred embodiment the distance between the first terminal 68 and the second terminal 70, and the size of the mercury bead 72 are such that the mercury bead 72 makes contact with the first terminal 68 when the second longitudinal axis "B" is about 7° form horizontal, with the first end 64 lower than the second end 66. This angle of 7° is known as the actuation angle. The mercury bead 72 can move within the generally hollow interior 62 of the mercury tilt switch 60 in a direction that is at least in part perpendicular to the second longitudinal axis "B". In moving about the mercury bead 72 sometimes is in contact with the second terminal 70, as best seen in FIG. 3, and sometimes is not in contact with the second terminal 70, as best seen in FIG. 4. The mercury bead 72 is, however, generally in contact with the first terminal 68 when the first end 64 of the mercury tilt switch 60 is oriented substantially fully downwardly. In order for the mercury tilt switch 60 to be electrically closed, the mercury bead 72 must be in electrical contact with both the first terminal 68 and the second terminal 70 simultaneously. Due to the generally flat shape of the first end 64 of the mercury tilt switch 60, it is very difficult for the mercury bead 72 to remain over the centrally disposed first terminal 68 only and not to touch the peripherally disposed second terminal 70. Resultingly, the mercury tilt switch 60 is closed almost certainly some of the time, typically most of the time, when the first end 64 is oriented substantially fully downwardly. However, it can be seen that when the first end 64 of the mercury tilt switch 60 is oriented substantially downwardly, the mercury bead 72 alternatingly connects the first and second terminals 68, 70 in electrically conductive relation with each other and subsequently breaks the connection, when the mercury tilt switch 60 is subjected to movement that is at least in part perpendicular to the second longitudinal axis "B". As the mercury bead 72 moves within the main body portion 61 it intermittently contacts the second terminal 70 and the first terminal 68. Positive continuous contact between the mercury bead 72 and the first and second terminals 68, 70 is not ensured—indeed, it is virtually guaranteed that positive continuous contact will not occur, as the mercury tilt switch 60 is moved. Thus, in the present context, the term "non-positive" indicates that the mercury bead 72 makes contact with both of the first terminal 68 and the second terminal 70 just part of the time that the first end 64 is oriented substantially fully downwardly, and that full positive contact is not ensured.

In the case of a common ordinary mercury switch, orienting the mercury switch such that the mercury bead falls to the contact end of the switch causes the mercury bead to be in electrical contact with both of the contacts, thus electrically closing the switch. If the mercury switch is jostled or otherwise moved, while remaining substantially in the same angular orientation, the mercury bead remains in positive electrical contact with both of the contacts. Thus, the mercury switch remains electrically closed.

The luring means 20 is preferably generally elongated and contains the battery 40, the mercury tilt switch 60 and the light emitting diode 50 are all positioned in seriatim within the generally hollow interior 33 of the protective housing 30.

Also situated in seriatim relationship within the generally hollow interior 33 of the protective housing 30, between the mercury tilt switch 60 and the battery 40, is a spring member 80, which is in interposed relation between the first terminal 68 of the mercury switch 60 and the second terminal 44 of the battery 40. The spring member 80 connects the first terminal 68 of the mercury tilt switch 60 and the second terminal 44 of the battery 40 in electrically conductive relation to each other. Further, the spring member 56 physically biases the battery 40 against the second lead 54 of the light emitting diode 50, so as to ensure good electrical contact, and to bias the light emitting diode 50 into recess 35 in the first half 31 of the protective housing 30. The spring member 80 also physically biases the mercury tilt switch 60 securely into a recess 37 in the second half 32 of the protective housing 30.

The mercury tilt switch 60 is connected in series with the battery 40 and the light emitting diode 50. The first lead 52 of the light emitting diode 50 contacts in electrically conductive relation a conductive member in the form of a metal strip 56, which in turn contacts in electrically conductive relation a metal ring 58. The metal ring 58 is, in turn, electrically conductive relation with the outer perimeter of the second terminal 70 of the mercury tilt switch 60.

The battery 40, the light emitting diode 50, and the mercury tilt switch 60 are in a complete electrical circuit wherein the light emitting diode 50 is energized by the battery 40 when the mercury tilt switch 60 is closed. Thus, the purpose of the mercury tilt switch 60 is for turning the light emitting diode on and off. Movement of the mercury tilt switch 60 causes the mercury bead 72 to move within the hollow interior 62 of the mercury tilt switch 60 in a direction that is at least in part, perpendicular to the second longitudinal axis "B" so as to alternatingly connect the first and second terminals 68, 70 in electrically conductive relation with each other, and to break the connection upon angular and translational movement of the mercury tilt switch 60 such that the mercury tilt switch 60 becomes correspondingly opened and closed intermittently.

It can be seen that, as the luring means 20 of the present invention moves through the water, it will take on orientations similar to those orientations shown in FIGS. 3, 4 and 5. In these orientations, the light emitting diode 50 is energized so as to be illuminated when the mercury bead 72 contacts the first terminal 68 and the second terminal 70 of the mercury tilt switch at the same time. This situation is shown in FIG. 3. As shown in FIGS. 4 and 5, the mercury bead 72 contacts only one of the first and second terminals 68, 70, but not the other of these two terminals, and correspondingly the mercury tilt switch remains open, the electric series circuit is not completed, and the light emitting diode 50 is not energized and is not illuminated. It can be seen that in the manner, the illuminating fish luring means 20 of the present invention in essence provides a luring means that has a flashing light source that is highly attractive to fish. Further, the light source works independently of any exterior source of light, such as sunlight.

Other modifications and alterations may be used in the design and manufacture of the Illuminated Fish Luring Means of the present invention without departing from the spirit and scope of the accompanying claims.

What is claimed is:

1. An electrically powered illuminating fish luring means for use in conjunction with a fishing line, said fish luring means comprising:

a water resistant protective housing having a generally hollow interior, a first datum point, a second datum point, and a first longitudinal axis passing through said first and second datum points;

an electrical power source having a first terminal and a second terminal, said electrical power source being securely retained within said interior of said protective housing;

an electrically powered illuminating means securely retained with said protective housing, said illuminating means having a first lead and a second lead;

a non-positive contact switch means electrically connected in series with said electrical power source and said electrically powered illuminating means for turning on and off said electrically powered illuminating means, wherein said electrical power source, said electrically powered illuminating means, and said switch means are in a complete electrical circuit, and said electrically powered illuminating means is energized by said electrical power source when said switch means is closed;

wherein said non-positive contact switch means has a generally hollow interior defined, in part, by a base at a first end, and a generally peripherally disposed main body portion with a second longitudinal axis generally centrally aligned within said hollow interior, said base being generally perpendicular to said second longitudinal axis; a first terminal centrally located on said base and a second terminal located on said main body portion and disposed in adjacent and peripheral relation to said base; and a terminal bridge member of nominal size less than the inside diameter of the main body portion adapted to contact said first and second terminals so as to thereby connect said first and second terminals in electrically conductive relation with each other;

wherein said non-positive contact switch means initially becomes closed when said fish luring means is oriented such that said first datum point is lower than said second datum point; and wherein, subsequently to said non-positive contact switch means becoming initially closed, movement of said terminal bridge member within said hollow interior of said non-positive contact switch means occurs generally across said base in such a manner so as to alternatingly make and break contact with said second terminal and thereby correspondingly intermittently connect said first and second terminals in electrically conductive relation with each other such that said non-positive contact switch means becomes correspondingly opened and closed intermittently.

2. The luring means of claim 1, wherein said movement actuated switch means is a mercury switch.

3. The luring means of claim 1, wherein said movement actuated switch means is a non-positive contact switch means.

4. The luring means of claim 2, wherein said first terminal is centrally disposed at said first end of said generally hollow interior and said second terminal is disposed generally around the periphery of said hollow interior.

5. The luring means of claim 4, wherein said movement actuated switch means is a mercury tilt switch.

6. The luring means of claim 5, wherein said electrical power source is a battery.

7. The luring means of claim 6, wherein said luring means contains said battery and said mercury tilt switch in the generally hollow interior of said protective housing.

8. The luring means of claim 7, wherein said luring means is generally elongated and said battery and said mercury tilt switch are physically displaced in seriatim.

9. The luring means of claim 8, wherein said battery is a button-type battery.

10. The luring means of claim 9, further comprising a spring member situated in interposed relation between said first terminal of said movement actuated switch means and said second terminal of said battery so as to connect said first terminal of said movement actuated switch means and said second terminal of said battery in electrically conductive relation to each other.

11. The luring means of claim 10, wherein said illuminating means is positioned in seriatim with said battery and said mercury tilt switch.

12. The luring means of claim 11, wherein said protective housing is made of plastic.

13. The luring means of claim 12, wherein said protective housing comprises a first half and a second half threadably engaged with one another.

14. The luring means of claim 13, wherein one of said first and second halves is made of a light transmitting material.

* * * * *